US009702122B2

(12) United States Patent
Hurley et al.

(10) Patent No.: US 9,702,122 B2
(45) Date of Patent: Jul. 11, 2017

(54) LOCK FOR AN EXCAVATION TOOTH ASSEMBLY

(71) Applicant: Bradken Resources Pty Limited, Mayfield West, NSW (AU)

(72) Inventors: Mark Hurley, Bar Beach (AU); Matthew Reushle, Rural View (AU)

(73) Assignee: Bradken Resources Pty Limited, Mayfield West, NSW (AU)

( * ) Notice: Subject to any disclaimer, the term of this patent is extended or adjusted under 35 U.S.C. 154(b) by 0 days.

(21) Appl. No.: 14/766,700

(22) PCT Filed: Jan. 8, 2014

(86) PCT No.: PCT/AU2014/000010
§ 371 (c)(1),
(2) Date: Aug. 7, 2015

(87) PCT Pub. No.: WO2014/121318
PCT Pub. Date: Aug. 14, 2014

(65) Prior Publication Data
US 2015/0368883 A1 Dec. 24, 2015

(30) Foreign Application Priority Data

Feb. 7, 2013 (AU) ................................ 2013900391
Apr. 12, 2013 (AU) ................................ 2013204833

(51) Int. Cl.
*E02F 9/28* (2006.01)
(52) U.S. Cl.
CPC ........... *E02F 9/2833* (2013.01); *Y10T 403/58* (2015.01)

(58) Field of Classification Search
CPC ..... E02F 9/2825; E02F 9/2833; E02F 9/2841; E02F 9/2808; E02F 9/2883; F16B 19/02; F16B 21/12; Y10T 403/7075; Y10T 403/589; Y10T 403/58
USPC ........................................... 37/446, 452–460
See application file for complete search history.

(56) References Cited

U.S. PATENT DOCUMENTS

| 4,067,657 | A | 1/1978 | Kaarlela |
| 6,439,796 | B1 * | 8/2002 | Ruvang ................. E02F 9/2841 37/455 |
| 7,069,676 | B2 | 7/2006 | Robinson et al. |
| 7,178,274 | B2 * | 2/2007 | Emrich ................. E02F 9/2841 37/453 |
| 7,603,799 | B2 * | 10/2009 | Campomanes ....... E02F 9/2841 37/456 |

(Continued)

OTHER PUBLICATIONS

International Search Report mailed Mar. 20, 2014, directed towards International Application No. PCT/AU2014/000010, 3 pages.

(Continued)

*Primary Examiner* — Robert Pezzuto
(74) *Attorney, Agent, or Firm* — Morrison & Foerster LLP

(57) ABSTRACT

A lock for an excavation tooth assembly comprising: a body; and a locking element mounted to the body, wherein the locking element is capable of adopting an inserting configuration with respect to the body to enable the lock to be inserted through a cavity in a nose and is capable of adopting a lockable configuration with respect to the body in which the locking element is arranged for engaging a tooth member mounted to the nose to lock the tooth member to the nose.

23 Claims, 3 Drawing Sheets

(56) References Cited

U.S. PATENT DOCUMENTS

| | | |
|---|---|---|
| 2005/0028407 A1 | 2/2005 | Ruvang et al. |
| 2007/0261278 A1 | 11/2007 | Campomanes |
| 2008/0209772 A1* | 9/2008 | Cui .................. E02F 9/2841 37/456 |
| 2009/0205228 A1 | 8/2009 | Ruvang |
| 2012/0055052 A1 | 3/2012 | Campomanes et al. |

OTHER PUBLICATIONS

International Preliminary Report on Patentability mailed Apr. 15, 2015, directed towards International Application No. PCT/AU2014/000010, 8 pages.

* cited by examiner

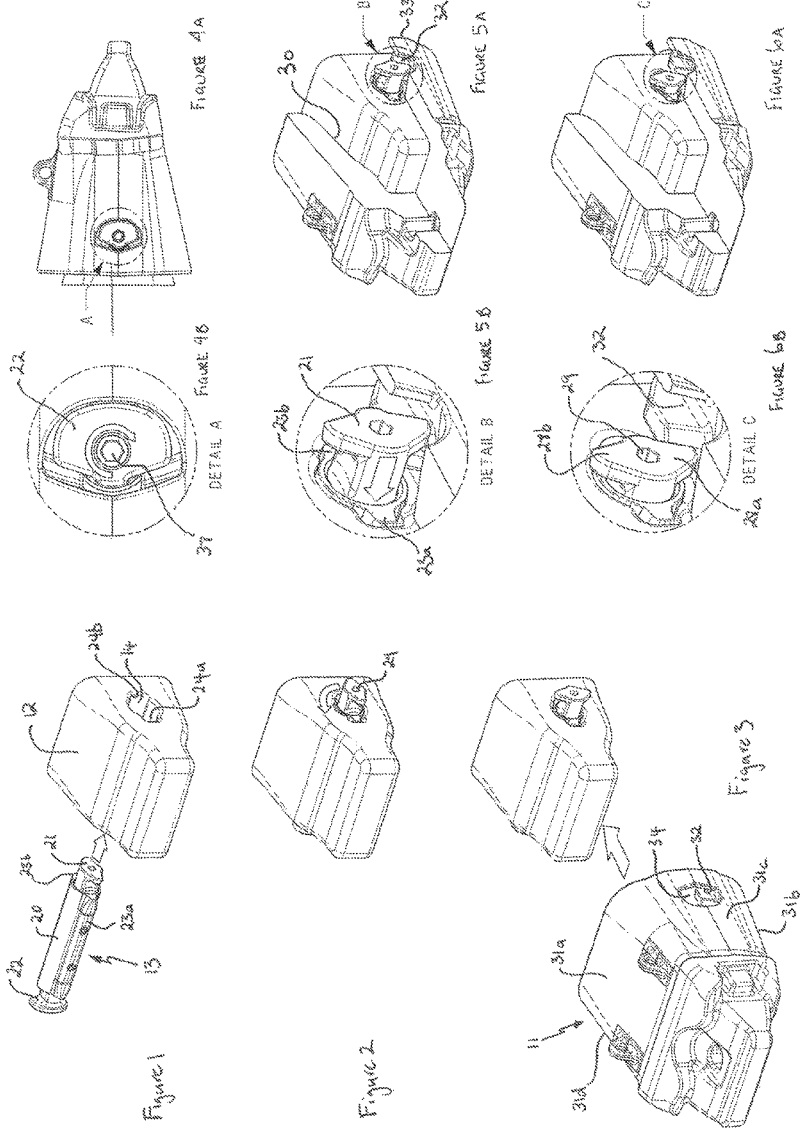

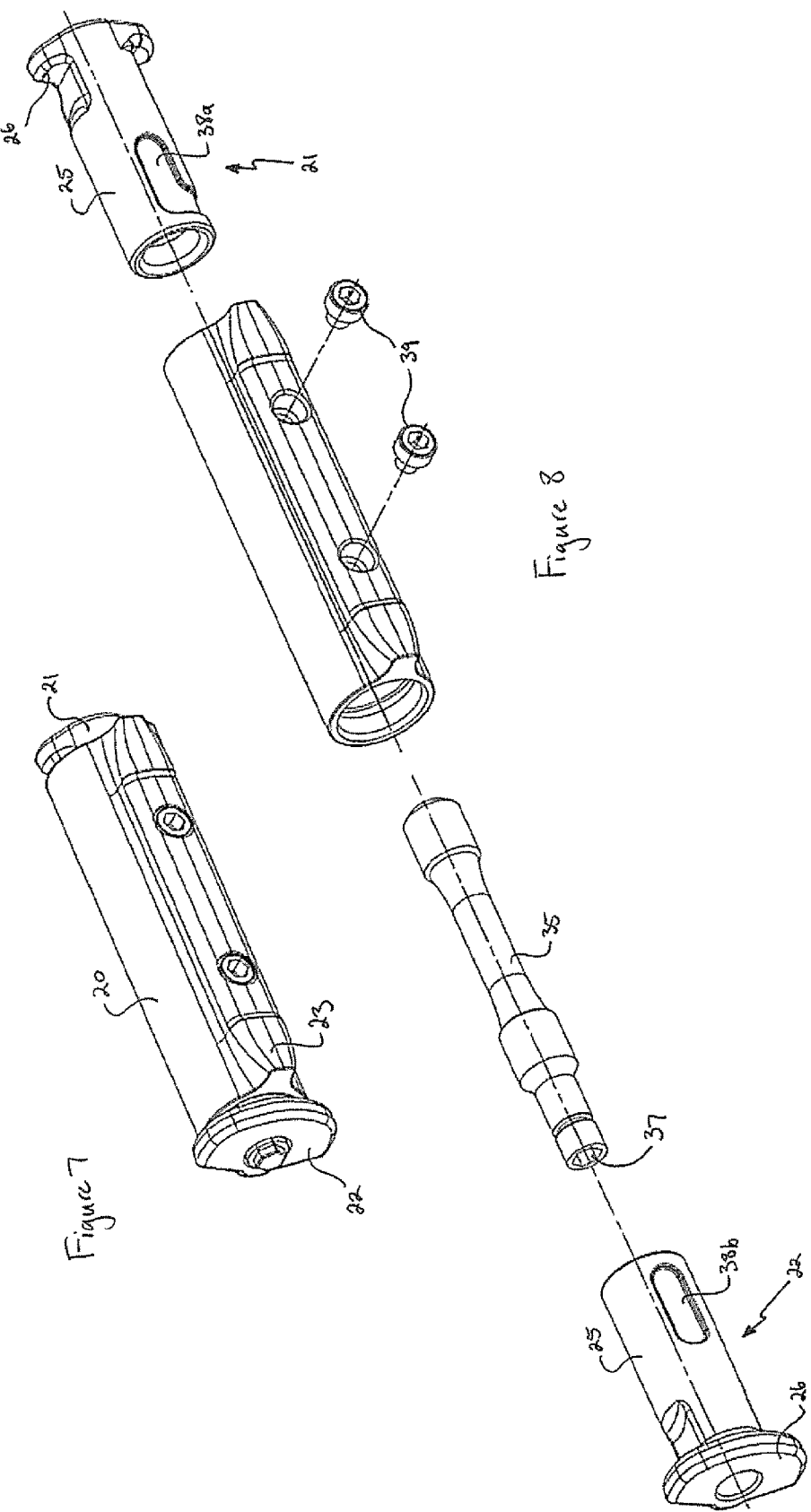

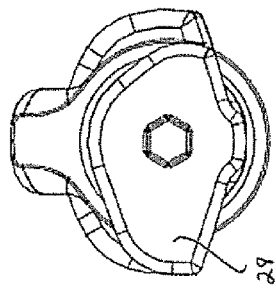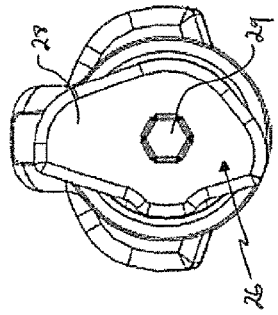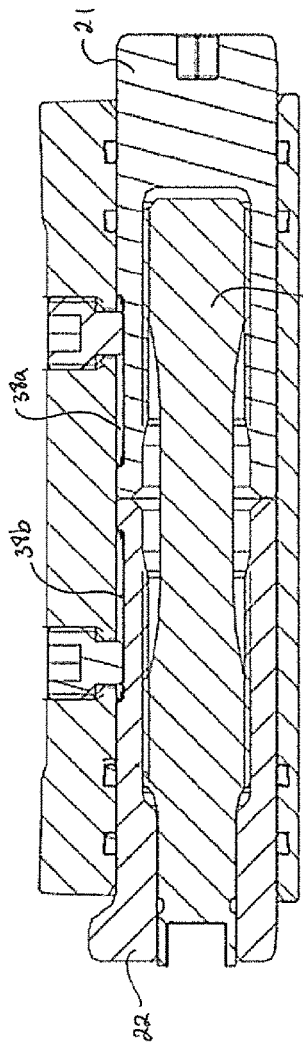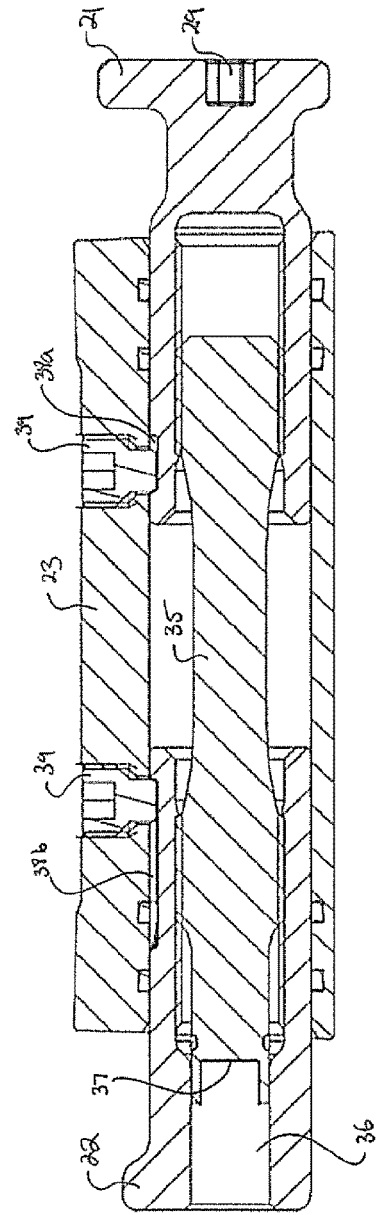

US 9,702,122 B2

LOCK FOR AN EXCAVATION TOOTH ASSEMBLY

CROSS-REFERENCE TO RELATED APPLICATIONS

This application is a U.S. National Phase patent application of International Patent Application No. PCT/AU2014/000010, filed Jan. 8, 2014, which claims the priority of Australian Application Nos. AU 2013900391, filed Feb. 7, 2013 and AU 2013204833, filed Apr. 12, 2013, is hereby incorporated by reference in the present disclosure in its entirety.

FIELD OF THE INVENTION

The present disclosure relates to locks for excavation tooth assemblies. The present disclosure also relates to excavation tooth assemblies. The present disclosure further relates to methods of locking an excavation tooth member to a nose and to methods of removing an excavation tooth lock from a cavity.

BACKGROUND OF THE INVENTION

Excavation teeth are provided on the digging edge of various pieces of digging equipment such as the buckets of front end loaders. Each excavation tooth is formed of a number of tooth members, commonly a point and an adapter and one or more locks for locking the tooth members together. The adapter is typically fitted to the excavation equipment and the point fits over a nose of the adapter and is retained in place by the lock. In some instances one or more intermediate tooth members may be also included between the point and the adapter. For ease of description it is to be understood that, unless the context requires otherwise, the term "adapter" used in this specification includes both the adapter arranged to be fitted to the excavation equipment or, if one or more intermediate tooth members are provided, to that intermediate tooth member(s) or to the combination of the adapter and the intermediate tooth member(s).

Also, unless the context requires otherwise, the term "nose" used in this specification is a projecting portion to which a tooth member of the excavation tooth is mounted and includes a projecting portion on the excavation equipment to which the adapter is mounted, a projecting part on the adapter to which the point or intermediate tooth member is mounted and a projecting part on the intermediate tooth member to which the point or other tooth members are mounted.

The reason that the excavation tooth is formed of a number of parts is to avoid having to discard the entire tooth when only a part of the tooth, in particular the ground engaging part of the tooth (i.e. the point) is worn or broken.

Various types of locks, points and adapters are known. However, it is always desirable to design new excavation tooth assemblies and parts thereof.

SUMMARY OF THE INVENTION

The present disclosure relates to improvements in relation to the locks used to lock the parts of excavation tooth assemblies together.

According to one embodiment, the present disclosure provides a lock for an excavation tooth assembly comprising:

a body; and
a locking element mounted to the body,
wherein the locking element is capable of adopting an inserting configuration with respect to the body to enable the lock to be inserted through a cavity in a nose and is capable of adopting a lockable configuration with respect to the body in which the locking element is arranged for engaging a tooth member mounted to the nose to lock the tooth member to the nose.

According to another embodiment, the present disclosure provides a lock for an excavation tooth assembly comprising:

a body; and
a locking element mounted to the body,
wherein the locking element is capable of adopting an inserting configuration with respect to the body to enable the lock to be inserted through a cavity in a nose and is capable of adopting a lockable configuration with respect to the body in which the lock cannot be removed from the cavity.

According to another embodiment, the present disclosure provides a lock for an excavation tooth assembly comprising:

a body; and
a locking element mounted to the body,
wherein the locking element is capable of adopting an inserting configuration and a lockable configuration with respect to the body, and is arranged to move between a retracted and extended position, the lock being arranged to be installed in the tooth assembly in the inserting configuration and is caused to move to lock components of the tooth assembly by changing from the inserting configuration to the locking configuration and moving between the retracted and extended positions.

According to another embodiment, the present disclosure provides an excavation tooth assembly comprising:

a tooth member mountable to a nose; and
a lock for locking the tooth member to the nose, the lock capable of adopting an inserting configuration to enable the lock to be inserted through a cavity in the nose and a lockable configuration in which the lock is arranged for locking the tooth member to the nose.

According to another embodiment, the present disclosure provides an excavation tooth assembly comprising:

a tooth member mountable to a nose; and
a lock capable of adopting an inserting configuration to enable the lock to be inserted through a cavity in a nose and is capable of adopting a lockable configuration in which the lock cannot be removed from the cavity.

According to another embodiment, the present disclosure provides an excavation tooth assembly comprising:

a tooth member mountable to a nose; and
a lock comprising a body and a locking element mounted to the body,
wherein the locking element is capable of adopting an inserting configuration and a lockable configuration with respect to the body, and is arranged to move between a retracted and extended position, the lock being arranged to be installed in the tooth assembly in the inserting configuration and is caused to move to lock components of the tooth assembly by changing from the inserting configuration to the locking configuration and moving between the retracted and extended positions.

According to another embodiment, the present disclosure provides an excavation tooth assembly comprising:

a tooth member mountable to a nose; and
a lock for locking the tooth member to the nose, the lock capable of adopting an inserting configuration to enable the lock to be inserted through a cavity in the nose and a lockable configuration in which the lock cannot be removed from the cavity.

According to another embodiment, the present disclosure provides a method of locking an excavation tooth member to a nose, the method comprising:

causing a lock to adopt an inserting configuration;
inserting the lock while in its inserting configuration through a cavity in the nose; and subsequently
causing the lock to adopt a lockable configuration;
mounting the tooth member to the nose; and
using the lock in its lockable configuration to lock the tooth member to the nose.

According to another embodiment, the present disclosure provides a method of mounting to the nose, a lock for locking a tooth member to the nose, the method comprising:

causing the lock to adopt an inserting configuration and inserting the so configured lock through a cavity in the nose; and adjusting the lock from its inserting configuration to a lockable configuration.

According to another embodiment, the present disclosure provides a method of removing a lock of an excavation tooth assembly from a cavity in a nose, the method comprising:

adjusting the lock from a lockable configuration to a removing configuration and subsequently removing the lock from the cavity.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 1-6 show an excavation tooth assembly according to an embodiment of the present disclosure being assembled in sequential steps from FIG. 1 through to FIG. 6.

FIG. 7 is a perspective view of a lock according to another embodiment of the present disclosure.

FIG. 8 is an exploded view of the lock of FIG. 7.

FIG. 9 is a cross-sectional side view of the lock of FIG. 7 in a retracted and lockable configuration.

FIG. 10 is an end view of the lock of FIG. 7 in its lockable configuration.

FIG. 11 is a cross-sectional side view of the lock of FIG. 7 in an extended and inserting configuration.

FIG. 12 is an end view of the lock of FIG. 7 in its inserting configuration.

DETAILED DESCRIPTION OF THE INVENTION

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure relates generally to excavation tooth assemblies for digging equipment. In the illustrated embodiment, an excavation tooth assembly is shown comprising an intermediate tooth member that is mounted to a nose fixed to a digging edge. A point tooth member is mounted to the intermediate tooth member. However, it is to be understood that embodiments of the present disclosure could be applied to excavation tooth assemblies in which the point tooth member is mounted directly on the nose fixed to the digging edge. In the excavation tooth assemblies of the present disclosure, locks are used to lock the tooth members to the nose and the point tooth member to the intermediate tooth member respectively.

Disclosed in some embodiments is a lock for an excavation tooth assembly comprising:

a body; and
a locking element mounted to the body, wherein the locking element is capable of adopting an inserting configuration with respect to the body to enable the lock to be inserted through a cavity in a nose and is capable of adopting a lockable configuration with respect to the body in which the locking element is arranged for engaging a tooth member mounted to the nose to lock the tooth member to the nose.

Advantageously, when the locking element is in the inserting configuration, the lock is capable of being inserted through the nose cavity for subsequent use when this would not be possible if the locking element was not in this configuration, eg. was in its lockable configuration.

Disclosed in some embodiments is a lock for an excavation tooth assembly comprising:

a body; and
a locking element mounted to the body, wherein the locking element is capable of adopting an inserting configuration with respect to the body to enable the lock to be inserted through a cavity in a nose and is capable of adopting a lockable configuration with respect to the body in which the lock cannot be removed from the cavity.

Advantageously, because the lock cannot be removed from the cavity when in its lockable configuration, assembly of the excavation tooth assembly is easier and more convenient. This is because the lock is retained in the cavity once in its lockable configuration and cannot be accidentally knocked out as the tooth member is mounted to the nose.

In some embodiments, the locking element in its inserting configuration is within the end envelope of the lock body and in its lockable configuration, the locking element has portions outside the end envelope of the lock body.

In some embodiments, the locking element has a head portion spaced from the body, the head portion having a maximum cross-sectional area that is wider in a first dimension than in a second dimension.

In some embodiments, the body has an end profile in cross-section through its longitudinal axis that is wider in a first dimension than in a second dimension.

In some embodiments, the locking element is in its inserting configuration with respect to the body when the wider first dimension of the locking element's head portion is laterally aligned with the wider first dimension of the body's end profile. In these embodiments, the locking element is in its lockable configuration with respect to the body when the wider first dimension of the locking element's head portion is out of lateral alignment with the wider first dimension of the body's end profile In some embodiments, the body is elongate and extends along a longitudinal axis between opposite ends, and the locking element rotates about the longitudinal axis between its inserting configuration and its lockable configuration.

In some embodiments, the locking element rotates 90° between its inserting and lockable configurations.

In some embodiments, the locking element rotates anti-clockwise from its inserting configuration to its lockable configuration. Also, the locking element rotates clockwise from its inserting configuration to its lockable configuration.

In some embodiments, in the lockable configuration, the locking element is operable to translate between extended and retracted positions with respect to the body to engage and disengage from the tooth member.

Translation of the locking element enables the locking element to move into and out of engagement with the tooth member when the locking element is in its lockable configuration. Advantageously, it also enables tightening of the engagement of the locking element with the tooth member to 'take up' any wear of the parts of the excavation tooth assembly.

In some embodiments, when in the inserting configuration the locking element is inhibited from moving between the extended and retracted positions.

In some embodiments, the locking element is able to be changed from the inserting configuration to the lockable configuration when the locking element is in one or more predetermined positions at or between the extended and retracted positions and is inhibited from changing when in other positions than the one or more predetermined positions. extended position In other embodiments, the one or more predetermined positions is one of the retracted or extended positions.

Advantageously, in the embodiments described above, the locking element cannot be accidentally rotated out of its lockable configuration once the lock has been translated into engagement with the tooth member.

In some embodiments, a guide arrangement is provided to guide movement of the locking element relative to the body to change between its inserting and lockable configurations and/or its extended and retracted positions.

In some embodiments, the locking element comprises an arm and one or more engagement portions extending from the arm, each engagement portion for engaging the tooth.

In some embodiments, the guide arrangement comprises an interfitting projection and recess, one of the projection or recess disposed on the arm and the other disposed on the body.

In some embodiments, the recess is L-shaped. The L-shaped recess limits the translation of the locking element when in its lockable configuration and limits the rotation of the locking element when it is extended or retracted as described in the above embodiments.

In some embodiments, each engagement portion is located at a distal end of the arm from the lock body. In these embodiments, the one or more engagement portions form the end portion of the locking element having a maximum cross-sectional area that is wider in a first dimension than in a second dimension.

In some embodiments, each engagement portion extends radially from the arm.

In some embodiments, the body comprises a hollow member, which is preferably cylindrical.

In some embodiments, the body has a flange extending from the hollow member and which is configured to be received in a slot of the nose cavity to restrict rotation of the lock body when the lock is inserted into the cavity.

In some embodiments, when the lock is in its inserting configuration, one of the engagement portions is aligned with the flange.

In some embodiments, the lock is operable to cause translation of the locking element from one end of the lock and rotation of the locking element from the opposite end.

In some embodiments, the lock comprises a drive shaft, the rotation of which causes translation of the locking element with respect to the lock body.

In some embodiments, the lock operating mechanism has a threaded formation which engages a threaded formation on the locking element.

In some embodiments, the drive shaft comprises a first tool engagement portion for engagement by a tool to operate the drive shaft.

In some embodiments, the locking element comprises a second tool engagement portion for engagement by a tool for rotating the locking element between its inserting and lockable configurations.

In some embodiments, the second tool engagement portion comprises a polygonal recess.

In some embodiments, the first and second tool engagement portions are located at opposite ends of the lock.

In some embodiments, the lock comprises a further locking element. The further locking element may be identical to the first-mentioned locking element.

In some embodiments, the locking element and the further locking element are located at opposed ends of the lock body.

In some embodiments, the further locking element is capable of adopting an inserting configuration with respect to the body to enable the lock to be inserted through a cavity in a nose and is capable of adopting a lockable configuration with respect to the body to enable the further locking element to engage a tooth member mounted to the nose to lock the tooth member to the nose.

Advantageously, where the further locking element is capable of adopting inserting and lockable configurations, this allows the lock to be inserted through the nose cavity from either end. This provides greater flexibility in assembling of the excavation tooth assembly.

In some embodiments, the further locking element is in a fixed configuration with respect to the lock body.

In some embodiments, the further locking element is capable of translating but not rotating.

In some embodiments, the further locking element has a passage into which the drive shaft extends.

In some embodiments, the passage is open at the distal end of the further locking element to provide tool access to the tool engagement portion of the drive shaft.

Disclosed in some embodiments is a lock for an excavation tooth assembly comprising:

a body; and a locking element mounted to the body, wherein the locking element is capable of adopting an inserting configuration and a lockable configuration with respect to the body, and is arranged to move between a retracted and extended position, the lock being arranged to be installed in the tooth assembly in the inserting configuration and is caused to move to lock components of the tooth assembly by changing from the inserting configuration to the locking configuration and moving between the retracted and extended positions.

Disclosed in some embodiments is an excavation tooth assembly comprising:

a tooth member mountable to a nose; and a lock for locking the tooth member to the nose, the lock capable of adopting an inserting configuration to enable the lock to be inserted through a cavity in the nose and a lockable configuration in which the lock is arranged for locking the tooth member to the nose.

In some embodiments, the lock is a lock as described in any one of the embodiments above.

In some embodiments, the tooth member has a socket for receiving the nose when mounted thereto.

In some embodiments, the tooth member has a slot in a wall of the socket for receiving the locking element of the lock.

In some embodiments, the slot is open to the socket.

In some embodiments, the slot has a window through an external surface of the tooth member for providing tool access to the lock when the excavation tooth assembly is in an assembled condition on the nose.

In some embodiments, the tooth member has one or more engagement portions forming at least part of the slot, each engagement portion for the locking element to engage to lock the tooth member to the nose.

In some embodiments, at least one of the engagement portions of the tooth member is located on an inner wall portion of the slot. In some embodiments, at least one of engagement portions of the tooth member is located on an outer wall portion of the slot.

In some embodiments, the lock is configured so that the locking element retracts into the lock body to engage the tooth member and lock the tooth member to the nose.

In some embodiments, the lock is configured so that the locking element extends outwards of the lock body to engage the tooth member and lock the tooth member to the nose.

Disclosed in some embodiments, is an excavation tooth assembly comprising:

a tooth member mountable to a nose; and a lock capable of adopting an inserting configuration to enable the lock to be inserted through a cavity in a nose and is capable of adopting a lockable configuration in which the lock cannot be removed from the cavity.

Disclosed in some embodiments, is an excavation tooth assembly comprising:

a tooth member mountable to a nose; and a lock comprising a body and a locking element mounted to the body, wherein the locking element is capable of adopting an inserting configuration and a lockable configuration with respect to the body, and is arranged to move between a retracted and extended position, the lock being arranged to be installed in the tooth assembly in the inserting configuration and is caused to move to lock components of the tooth assembly by changing from the inserting configuration to the locking configuration and moving between the retracted and extended positions.

Disclosed in some embodiments, is a method of locking an excavation tooth member to a nose, the method comprising:

causing a lock to adopt an inserting configuration;

inserting the lock while in its inserting configuration through a cavity in the nose; and subsequently causing the lock to adopt a lockable configuration;

mounting the tooth member to the nose; and using the lock in its lockable configuration to lock the tooth member to the nose.

In some embodiments, the lock comprises a body and a locking element mounted to the body and the lock's inserting configuration comprises an inserting configuration of the locking element with respect to the body and the lock's lockable configuration comprises a lockable configuration of the locking element with respect to the body.

In some embodiments, the locking element is rotated about the longitudinal axis of the body to adopt its inserting configuration.

In some embodiments, the locking element is rotated about the longitudinal axis of the body from its inserting configuration to its lockable configuration.

In some embodiments, the lock is inserted into the nose cavity at one end of the cavity until the locking element projects out of the nose cavity at an opposite end.

In some embodiments, the lock is inserted into the nose cavity by leading with the locking element.

In some embodiments, the tooth member has a socket and a slot in one of the walls of the socket, whereby when the tooth member is mounted to the nose, the nose is received in the socket and the locking element is received in the slot.

In some embodiments, using the lock to lock the tooth member to the nose comprises translating the locking element with respect to the body.

In some embodiments, the locking element retracts into the body when locking the tooth member to the nose.

In some embodiments, the locking element has one or more engagement portions each of which are brought into engagement with engagement portions of the tooth member when locking the tooth member to the nose.

In some embodiments, translating the locking element comprises rotating a drive shaft connected to the locking element.

In some embodiments, moving the locking element between its inserting and lockable configurations comprises engaging a tool engaging portion of the locking element with a tool and using the tool to rotate the locking element.

In some embodiments, the lock comprises a lock as described in any one of the embodiments above.

Disclosed in some embodiments is a method of mounting to a nose, a lock for locking a tooth member to a nose, the method comprising:

causing the lock to adopt an inserting configuration and inserting the so configured lock through a cavity in the nose; and adjusting the lock from its inserting configuration to a lockable configuration.

Disclosed in some embodiments is a method of removing a lock of an excavation tooth assembly from a cavity in a nose, the method comprising:

adjusting the lock from a lockable configuration to a removing configuration and subsequently removing the lock from the cavity.

The removing configuration of the lock is substantially the same as its inserting configuration as described above.

Referring to the Figures, illustrative embodiments of an excavation tooth assembly 10 is shown and will now be described.

The excavation tooth assembly 10 comprises an intermediate tooth member 11 that is mounted to a nose 12 and a lock 13 for locking the intermediate tooth member 11 to the nose 12 when so mounted. Although not shown in the Figures, the excavation tooth assembly also comprises a point tooth member that is mounted and locked to the intermediate tooth member. The point tooth member provides the ground engaging edge of the excavation tooth. The nose 12 is a projecting portion of an adapter that is attached to or integrally formed with the digging edge of a piece of excavation equipment. The nose 12 has a cavity 14 for receiving the lock 13 when the excavation tooth assembly 10 is assembled.

The lock 13 comprises an elongate body 20 that extends along a longitudinal axis between opposite ends and first and second locking elements 21, 22 mounted to and extending from the body at opposite ends of the body. Although in other embodiments, the lock may have only a single locking element mounted one end of the body. In the embodiment shown in the Figures, the locking elements 21, 22 have different shapes, but in other embodiments they may be identically shaped.

The lock body 20 is in the form of a generally cylindrical hollow member having a flange 23*a* that projects from and extends along the length of the body. When the lock 13 is inserted into the cavity 14 of the nose 12, the flange 23*a* is received in a slot 24*a* of the cavity (which is otherwise generally cylindrical in shape). Receipt of the flange 23*a* in the slot 24*a* limits rotation of the lock body 20 in the cavity 14. The flange 23*a* also provides the lock body 20 with a profile in cross-section through the body's longitudinal axis which is wider in a first dimension than in a second dimension. In the embodiment shown in FIGS. 1-6, the lock body 20 has two flanges 23*a* and 23*b* on opposed sides of the body and the cavity 14 consequently has two slots 24*a, b* for receipt of the respective flanges. However, the embodiment shown in FIGS. 7-12 varies in that the lock body 20 of the lock 13 shown in these Figures only has a single flange 23.

Each of the locking elements 21, 22 comprises an arm 25 which is received in the lock body 20 and an enlarged head portion 26 at the distal end of the arm 25 from the lock body 20. The enlarged head portion 26 defines one or more engagement portions for engaging the tooth member 11 to lock it to the nose 12 when the excavation tooth assembly 10 is assembled. In the embodiment shown in the Figures the head portion 26 is approximately D-shaped. The enlarged head portion 26 has a maximum cross-sectional area which is wider in a first dimension than in a second dimension. In the embodiment illustrated in FIGS. 1-6, the first element's head portion 26 has enlarged lobes 28*a,b* on either side. However, in the embodiment of FIGS. 7-12, the first element's head portion has only a single enlarged lobe 28 on one side of the head portion. Nevertheless, in both embodiments the first element's head portion is larger than the second element's head portion.

Although some differences in shape have been described above between the embodiment of FIGS. 1-6 and the embodiment of FIGS. 7-12, the embodiments operate in a similar manner and the description below applies to both embodiments.

The first locking element 21 can be adjusted between an inserting configuration with respect to the lock body 20 (as shown for example in FIGS. 1 and 2) and a lockable configuration with respect to the lock body 20 (as shown for example in FIGS. 3, 5 and 6). In the inserting configuration, the first locking element 21 which is to lead the insertion of the lock 13 into the nose cavity 14 has been arranged so that the locking element and the lock itself can fit into and through the nose cavity 14. In particular, the locking element 21 has been rotated to the extent that the wider first dimension of its enlarged head 26 is laterally aligned with the wider first dimension of the lock body's profile and as a result is within the envelope of the lock body's end profile. Because the nose cavity 14 is shaped to receive lock body 20, with the first locking element 21 in this inserting configuration, the lock 13 can also pass into and through the cavity until the first locking element 21, is projecting from the opposite side of the nose 12 to that from which it was inserted. The lock 13 cannot be inserted into the nose cavity 14 at all without adjusting the locking element into its inserting configuration. Notably, the second locking element 22 is not arranged into an inserting configuration and cannot fit into the nose cavity 14, which prevents the lock 13 from being inserted too far through the cavity.

Once the lock 13 has been inserted through the nose cavity 14, the first locking element 21 is adjusted into its lockable configuration by rotating the locking element. In the embodiments shown in the Figures, the locking element is rotated anti-clockwise approximately 90° from its inserting configuration to its lockable configuration. This puts the wider first dimension of its enlarged head 26 out of lateral alignment with wider first dimension of the lock body's profile. However, as a result of doing this, the enlarged head 26 is able to subsequently engage a much greater surface area of the tooth member 11 after it has been mounted onto the nose 12. This improves the strength of the engagement of the lock with the tooth member 11.

In addition, because the lock 13 is able to adjust between an inserting and a lockable configuration, a lock having larger engagement portions for engaging the tooth member can be inserted through the nose cavity than has previously been the case. Because previous locks could not make this adjustment, the maximum size of their locking elements were limited by the smaller second dimension of the nose cavity. Furthermore, once the lock 13 is inserted into the nose cavity 14 and adjusted out of its inserting configuration to its lockable configuration, the lock 13 cannot be inadvertently removed from the nose cavity. This means that the lock 13 is safely retained in the nose cavity and for example cannot be accidentally knocked out when installing the tooth member 11 over the nose 12.

The tooth member 11 has a socket 30 defined by top, bottom and side walls 31*a-d* for receiving the nose 12 when the assembly 10 is assembled. Slots 32 are formed in each of the side walls 31*c,d* for receiving the respective locking elements 21, 22 of the lock 13. When the lock 13 is inserted into the nose cavity 14, the locking elements 21, 22 extend outward of the nose 12 as shown for example in FIG. 3. The slots 32 of the tooth member 11 each open in an end face 33 of the tooth member 11 (which the socket 30 also opens to for receiving the nose 12) and to the socket 30 through the internal surface 33 of their respective side wall 31*c, d*. This enables the locking elements 21, 22 to be received into respective slots 32 as the tooth member 11 is pushed onto the nose 12 during assembly of the excavation tooth assembly 10.

Each of the slots 32 have a window 34 through the external surface of respective socket side walls 31*c,d*. This enables tool access to the lock 13 when the excavation tooth assembly 10 is assembled for operation of the lock to lock and unlock the tooth member 11 in its mounting to the nose 12.

Although in the embodiment shown in FIGS. 1-6 the slots 32 are formed in the side walls 31*c,d* of the socket 30, in other embodiments they are formed in the top and bottom walls 31*a,b*. In other embodiments, where the lock has only one locking element, the tooth member may be provided with only a single slot in one of the walls defining the socket.

To lock the tooth member 11 onto the nose 12, the enlarged head 26 of each of the locking elements 21, 22 engages a portion of the wall that defines the slots 32. Both of the locking elements 21, 22 are enabled to translate with respect to the lock body 20 between extended and retracted positions in order to bring the engaging portions of its enlarged head 26 into engagement with the tooth member. In the embodiments shown in the Figures, both of the locking elements 21, 22 are retractable into the lock body 20 to engage an inner wall portion of one of the slots 32 in order to lock the tooth member 11 to the nose 12. However, in other embodiments, at least one of the locking elements could be extendable out of the lock body to engage an outer wall of a slot.

Translation of the locking elements 21, 22 is achieved by causing rotation of a drive shaft 35 housed within the lock body 20. The drive shaft 35 comprises a member having a threaded portion that is connected by threaded engagement to the arms 25 of each of the locking elements.

The drive shaft 35 extends into a passage 36 through the second locking element 22. The passage 36 is open at the distal end of the second locking element 22 from the lock body 20 to enable tool access to the drive shaft. In particular, the drive shaft 35 has a first tool engagement portion 37 which is accessible by a suitable tool through the open passage to operate the drive shaft 35 and cause translation of the locking elements 21, 22.

Each of the locking elements 21, 22 have recesses 38 formed in their respective arms 25. Received in each of the recesses 38 are projections from the lock body 20 in the form of grub screws 39 that are mounted to the lock body. The receipt of the grub screws 39 in the recesses provides a guide arrangement for the movement of the locking elements 21, 22. The second locking element's recess 38b is linear in the longitudinal axis of the lock body 20. This substantially prevents rotation of the second element 22 (but allows translation). The limited length of the second locking element's recess 38b also limits how far the second locking element can translate and mitigates against the second locking element coming completely out of the lock body 20. The first locking element's recess 38a is L-shaped, having a portion extending in the longitudinal axis of the lock body 20 and a portion extending orthogonally to the longitudinal axis of the lock body. This shaping of the recess 38a enables the first locking element to rotate and translate. Notably, however, because the recess 38a is L-shaped, the first locking element 21 must be in its extended position to be able to be rotated into its inserting configuration and in its inserting configuration its capability of translating is limited (see FIGS. 11 and 12). Furthermore, when the first locking element 21 is adjusted from its extended position towards its retracted position, its ability to rotate is limited and the first locking element is restricted to its lockable configuration (see FIGS. 9 and 10).

Rotation of the first locking element 21 between its inserting and lockable configurations is carried out by engaging a tool in a second tool engagement portion 29 of the lock 13 which is in the form of a hexagonal recess in the end face of the locking element 21 which is distal from the lock body 20. It is noted that the first tool engagement portion 37 is at the opposite end of the lock 13 to the second tool engagement portion 29 and that as a result, the lock is operable to rotate the first locking element 21 from one end and operable to translate the locking elements 21, 22 from the other end of the lock.

In other embodiments to that shown in the Figures, each of the locking elements are identical and are capable of translating and rotating with respect to the lock body. This, advantageously, means that the lock does not need to be inserted into the nose cavity from one specific side. In yet other embodiments only one of the locking elements is capable of translating and rotating with respect to the body and the other of the locking elements is fixed with respect to the body.

Referring specifically to FIGS. 1-6, the excavation tooth assembly 10 is assembled as follows:

The first locking element 21 is adjusted into its inserting configuration (as shown in FIG. 1) by rotating the locking element clockwise by approximately 90° (if rotating fully from its lockable configuration). The lock 13, with its first locking element 21 in the inserting configuration, is subsequently inserted into the nose cavity 14, leading with the first locking element 21 (FIG. 1). The lock 13 is inserted until the locking element 21 projects out of the nose cavity on the other side of the nose 12 from which it was inserted and the lock body 20 is received within the nose cavity 14 (FIG. 2). The second locking element 22 remains projecting from the nose 12 on the side from which the lock 13 was inserted into the cavity.

The first locking element 21 is then adjusted into its lockable configuration by rotating the locking element 21 anticlockwise by approximately 90° (FIGS. 2 and 3). The tooth member 11 is then mounted to the nose 12 by sliding the socket 30 of the tooth member over the nose (FIG. 3). In doing so, the locking elements 21, 22 are received in respective slots 32 of the tooth member 11.

The locking elements 21, 22, are subsequently retracted into the body 20 to bring the engagement portions of their heads 26 into engagement with inner wall portions of their respective slots (FIGS. 4-6). This is achieved by applying a rotational force on the drive shaft 35 by engaging a tool with its tool engagement portion 37 through the passage 36 in the second locking element 22 (FIG. 4).

During use of the excavation tooth 10 in excavation, the parts will be subjected to wear. Any looseness in the engagement between the lock 13 and the tooth member 11 as a result of this wear can be taken up by further retracting the locking elements 21, 22 into the lock body 20.

The excavation tooth assembly 10 is disassembled, for example to replace a worn or broken part, essentially by the reverse of the assembly process.

The locking elements 21, 22 are first disengaged from engagement with the tooth member 11 by translating the locking elements out of the lock body 20. The tooth member 11 is then removed from the nose 12 by sliding the socket off the nose and the slots 32 over the locking elements 21, 22. The first locking element 21 is then rotated from its lockable configuration to its inserting (removing) configuration and the lock 13 is then able to be pulled from the nose cavity 14.

In the claims which follow and in the preceding disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the present disclosure.

Accordingly, the present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods which can, of course, vary. It is also to be understood that the terminology used herein is for the purpose of describing particular embodiments only, and is not intended to be limiting.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A lock for locking a tooth member to a nose in an excavation tooth assembly comprising:
   a body; and
   a locking element mounted to the body,
   wherein the locking element is capable of adopting an inserting configuration with respect to the body to enable the lock to be inserted through a cavity in the nose and is capable of adopting a lockable configuration with respect to the body in which the lock cannot be removed from the cavity, the locking element rotating between the inserting configuration and the lockable configuration, wherein the locking element in the lockable configuration is arranged for engaging the tooth member mounted to the nose to lock the tooth member to the nose, and wherein in the lockable configuration, the locking element is operable to translate between an extended position in which the locking member is disengaged from the tooth member and a retracted position in which the locking member is engaged with the tooth member and the tooth member is locked to the nose.

2. The lock of claim 1, wherein the body is elongate and extends along a longitudinal axis between opposite ends, and wherein the locking element rotates about the longitudinal axis between the inserting configuration and the lockable configuration.

3. The lock of claim 1, wherein the locking element in the inserting configuration is within an end envelope of the lock body and in the lockable configuration, the locking element has portions outside the end envelope of the lock body.

4. The lock of claim 2, wherein the locking element has a head portion spaced from the body, the head portion having a maximum cross-sectional area that is wider in a first dimension than in a second dimension and the body has an end profile in cross-section through the longitudinal axis that is wider in a first dimension than in a second dimension.

5. The lock of claim 4, wherein the locking element is in the inserting configuration with respect to the body when the wider first dimension of the locking element's head portion is laterally aligned with the wider first dimension of the body's end profile and the locking element is in the lockable configuration with respect to the body when the wider first dimension of the locking element's head portion is out of lateral alignment with the wider first dimension of the body's end profile.

6. The lock of claim 5, wherein the locking element rotates 90° between the inserting and lockable configurations.

7. The lock of claim 1, wherein when in the inserting configuration the locking element is inhibited from moving between the extended and retracted positions.

8. The lock of claim 1, wherein the locking element is able to be changed from the inserting configuration to the lockable configuration when the locking element is in at least one predetermined position at or between the extended and retracted positions and is inhibited from changing when in other positions than the at least one predetermined position.

9. The lock of claim 8, wherein the locking element comprises an arm and at least one engagement portion extending from the arm, each engagement portion for engaging the tooth member and extending radially from the arm.

10. The lock of claim 1, wherein a guide arrangement is provided to guide movement of the locking element relative to the body to change between the inserting and lockable configurations.

11. The lock of claim 10, wherein the guide arrangement comprises an interfitting projection and recess, one of the projection or recess is disposed on the arm and the other is disposed on the body.

12. The lock of claim 10, wherein a guide arrangement is provided to guide movement of the locking element relative to the body to change between the extended and retracted positions.

13. The lock of claim 1, wherein the body comprises a hollow member and has a flange extending from the hollow member and which is configured to be received in a slot of the nose cavity to restrict rotation of the lock body when the lock is inserted into the cavity and wherein, when the lock is in the inserting configuration, one of the engagement portions is aligned with the flange.

14. The lock of claim 1, wherein the lock comprises a further locking element that is capable of adopting an inserting configuration with respect to the body to enable the lock to be inserted through the cavity in the nose and is capable of adopting a lockable configuration with respect to the body to enable the further locking element to engage the tooth member mounted to the nose to lock the tooth member to the nose.

15. The lock of claim 1, wherein the lock comprises a further locking element that is in a fixed configuration with respect to the lock body.

16. The lock of claim 1, wherein the lock is operable to cause translation of the locking element from one end of the lock and rotation of the locking element from the opposite end of the lock.

17. The lock of claim 1, wherein the lock comprises a lock operating mechanism, the rotation of the lock operating mechanism causes translation of the locking element with respect to the lock body, the lock operating mechanism comprising a first tool engagement portion for engagement by a tool to cause translation of the locking element and a second tool engagement portion for engagement by a tool for rotating the locking element between the inserting and lockable configurations.

18. The lock of claim 1, wherein the lock comprises a further locking element that is capable of translating but not rotating.

19. The lock of claim 1, wherein a guide arrangement is provided to guide movement of the locking element relative to the body to change between the extended and retracted positions.

20. A lock for an excavation tooth assembly comprising:
   a body; and
   a locking element mounted to the body,
   wherein the locking element is capable of rotating between an inserting configuration and a lockable configuration, the inserting configuration is where the locking element is positioned with respect to the body to enable the lock to be inserted into the cavity of the nose, and the lockable configuration is where the locking element is positioned with respect to the body such that the lock cannot be removed from the cavity, and the locking element is arranged to move between a retracted position in which the locking member is engaged with the tooth member and the tooth member is locked to the nose and an extended position in which the locking member is disengaged from the tooth member, the lock being arranged to be installed in the tooth assembly in the inserting configuration and in the lockable configuration cannot be removed from the tooth assembly, and wherein the locking element is caused to move to lock components of the tooth assembly by changing from the inserting configuration to the lockable configuration and moving between the retracted and extended positions.

21. An excavation tooth assembly comprising:
a tooth member mountable to a nose; and
a lock for locking the tooth member to the nose, the lock comprising:
a body; and
a locking element mounted to the body,
wherein the locking element is capable of adopting an inserting configuration with respect to the body to enable the lock to be inserted into a cavity in the nose and is capable of adopting a lockable configuration with respect to the body in which the lock cannot be removed from the cavity, wherein the locking element in the lockable configuration is arranged for engaging the tooth member mounted to the nose to lock the tooth member to the nose, and wherein in the lockable configuration, the locking element is operable to translate between an extended position in which the locking member is disengaged from the tooth member and a retracted position in which the locking member is engaged with the tooth member and the tooth member is locked to the nose and when the locking element is disengaged from the tooth member in the lockable configuration, the tooth member can be removed from the nose.

22. The excavation tooth assembly of claim 21, wherein the tooth member has a socket for receiving the nose when mounted thereto and a slot in a wall of the socket for receiving the locking element of the lock.

23. The excavation tooth assembly of claim 21, wherein the tooth member has at least one engagement portion forming at least part of the slot, each engagement portion for the locking element to engage to lock the tooth member to the nose.

* * * * *